(12) United States Patent
Velten et al.

(10) Patent No.: US 12,503,111 B2
(45) Date of Patent: Dec. 23, 2025

(54) METHOD AND DEVICE FOR ASCERTAINING AN ACCELERATION SPECIFICATION FOR A VEHICLE

(71) Applicant: Bayerische Motoren Werke Aktiengesellschaft, Munich (DE)

(72) Inventors: Thomas Velten, Siegsdorf (DE); Tamas Fendler, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 250 days.

(21) Appl. No.: 18/561,967

(22) PCT Filed: May 18, 2022

(86) PCT No.: PCT/EP2022/063489
§ 371 (c)(1),
(2) Date: Nov. 17, 2023

(87) PCT Pub. No.: WO2022/243393
PCT Pub. Date: Nov. 24, 2022

(65) Prior Publication Data
US 2024/0253630 A1    Aug. 1, 2024

(30) Foreign Application Priority Data
May 20, 2021    (DE) .................... 10 2021 113 170.7

(51) Int. Cl.
*B60W 30/16*    (2020.01)
*B60W 30/18*    (2012.01)
*B60W 50/00*    (2006.01)

(52) U.S. Cl.
CPC ...... *B60W 30/16* (2013.01); *B60W 30/18163* (2013.01); *B60W 50/0097* (2013.01);
(Continued)

(58) Field of Classification Search
CPC .......... B60W 30/16; B60W 30/18163; B60W 50/0097; B60W 2720/10;
(Continued)

(56) References Cited

U.S. PATENT DOCUMENTS

2003/0109979 A1    6/2003  Schuster et al.
2006/0217866 A1    9/2006  Moebus
(Continued)

FOREIGN PATENT DOCUMENTS

DE    101 55 204 A1    5/2003
DE    10 2016 012 466 A1    5/2017
(Continued)

OTHER PUBLICATIONS

International Search Report (PCT/ISA/210) issued in PCT Application No. PCT/EP2022/063489 dated Aug. 31, 2022 with English translation (4 pages).
(Continued)

*Primary Examiner* — Jason Holloway
(74) *Attorney, Agent, or Firm* — Crowell & Moring LLP (57) ABSTRACT

An apparatus is provided for determining a vehicle acceleration specification for a vehicle while operating a plurality of different automated driving functions in a vehicle. The apparatus is designed to determine, for a determined point in time, a plurality of function-specific acceleration specifications for the corresponding plurality of driving functions using a plurality of controllers. The apparatus is additionally designed to determine the vehicle acceleration specification for automated guidance of the vehicle at the determined point in time on the basis of the plurality of function-specific acceleration specifications. The apparatus is additionally designed to provide feedback pertaining to the determined vehicle acceleration specification to at least some of the plurality of controllers.

11 Claims, 3 Drawing Sheets

(52) U.S. Cl.
CPC ... *B60W 2720/10* (2013.01); *B60W 2720/106* (2013.01); *B60W 2754/30* (2020.02)

(58) Field of Classification Search
CPC ....... B60W 2720/106; B60W 2754/30; B60W 50/0098; B60W 2050/0008; B60W 2050/0027; B60W 2050/0094
See application file for complete search history.

(56) References Cited

U.S. PATENT DOCUMENTS

| | | | |
|---|---|---|---|
| 2017/0217436 A1 | 8/2017 | Inomata | |
| 2018/0046191 A1 | 2/2018 | Keller et al. | |
| 2019/0079523 A1 | 3/2019 | Zhu et al. | |
| 2020/0150659 A1* | 5/2020 | Guptha | B62D 15/025 |
| 2020/0225676 A1* | 7/2020 | Telpaz | B60W 40/09 |
| 2023/0086872 A1* | 3/2023 | Fukukawa | B60W 10/08 701/93 |

FOREIGN PATENT DOCUMENTS

| | | |
|---|---|---|
| EP | 1 594 714 B1 | 7/2006 |
| EP | 3 281 830 A1 | 2/2018 |

OTHER PUBLICATIONS

German-language Written Opinion (PCT/ISA/237) issued in PCT Application No. PCT/EP2022/063489 dated Aug. 31, 2022 with English translation (8 pages).

German Search Report issued in German Application No. 10 2021 113 170.7 dated Jan. 19, 2022 with partial Enlish translation (11 pages).

"Rechtsfolgen zunehmender Fahrzeugautomatisierung," Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles," Surface Vehicle Recommended Practice, SAE (Society of Automotive Enoioneerin International, J3016™, Sep. 2016, pp. 1-30 (30 pages).

* cited by examiner

METHOD AND DEVICE FOR ASCERTAINING AN ACCELERATION SPECIFICATION FOR A VEHICLE

BACKGROUND AND SUMMARY

The invention relates to a method and a corresponding device for ascertaining an acceleration specification for a vehicle, in particular for automated longitudinal and/or lateral guidance of a vehicle.

A vehicle can include multiple different driving functions, in particular driver assistance functions, which assist the driver of the vehicle in the longitudinal and/or lateral guidance of the vehicle. For example, the distance of the vehicle to a front vehicle driving in front of the vehicle can be set automatically by a driving function during a following drive. In a further driving function, the driving speed of the vehicle can be set automatically during a free drive. Furthermore, the driving speed of the vehicle can be set automatically upon a lane change in a further driving function.

It can be made possible for the driver of a vehicle to operate multiple driving functions simultaneously. For example, the distance and speed controllers of the vehicle can be operated simultaneously and the lane change assistant can be activated proceeding therefrom. The present document relates to the technical object of increasing the comfort of the automated longitudinal and/or lateral guidance of a vehicle during the parallel operation of multiple automated driving functions.

The object is achieved by each of the independent claims. Advantageous embodiments are described, inter alia, in the dependent claims. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for ascertaining a vehicle acceleration specification for a vehicle during operation of a plurality of different automated driving functions in a vehicle is described. The individual automated driving functions can be designed to effectuate automated longitudinal and/or lateral guidance of the vehicle. The plurality of automated driving functions can comprise in particular: a distance controller for a following drive of the vehicle (which is designed to set the (longitudinal) distance of the vehicle to a front vehicle to a set setting distance); a speed controller for a free drive of the vehicle (which is designed to set the (longitudinal) driving speed of the vehicle to a set setting driving speed); and/or a lane change assistant for a lane change of the vehicle, which is designed to guide the vehicle in an automated manner starting from a currently traveled lane onto an adjacent lane).

The individual driving functions can each include a controller, using which one or more state variables of the vehicle can each be set to a target value. A state variable can in this case be the (longitudinal and/or lateral) acceleration of the vehicle. In the vehicle, in the context of the operation of the plurality of automated driving functions, a corresponding plurality of controllers can therefore be operated. The different controllers can use different control algorithms in this case.

The plurality of controllers can comprise: a path guidance controller (for example, for the speed controller); a P controller (for example, for the distance controller); and/or a planning controller, which is designed to plan an upcoming trajectory of the vehicle in order to ascertain an acceleration specification (i.e., a target acceleration) for the vehicle (for example, for the speed controller and/or for the lane change assistant).

The device is configured, for a specific point in time (from a sequence of successive points in time), on the basis of the plurality of controllers, to ascertain a corresponding plurality of function-specific acceleration specifications for the plurality of driving functions. The individual controllers of the driving functions operated in parallel can thus be operated (each independently of one another) in order to ascertain a function-specific acceleration specification (i.e., a target acceleration) for the vehicle in each case.

The device can furthermore be configured to ascertain the vehicle acceleration specification for the automated (longitudinal and/or lateral) guidance of the vehicle at the specific point in time on the basis of the plurality of function-specific acceleration specifications. The device can be configured in particular to select one, in particular the relatively smallest function-specific acceleration specification, of the plurality of function-specific acceleration specifications as the vehicle acceleration specification. The device can be configured, for example, to select the function-specific acceleration specification from the plurality of function-specific acceleration specifications as the vehicle acceleration specification which has the relatively smallest value (in consideration of the sign), and/or which is intended for the least possible acceleration or the highest possible deceleration of the vehicle.

Therefore, for the specific point in time, one controller can be selected from the plurality of controllers, the function-specific acceleration specification of which is used for the automated (longitudinal and/or lateral) guidance of the vehicle. The controller having the smallest acceleration specification or the highest deceleration specification can be selected here. Robust (longitudinal and/or lateral) guidance of the vehicle can thus also be effectuated during operation of multiple automated driving functions.

The device can be configured to operate at least one longitudinal and/or lateral guidance actuator (e.g., a drive motor, a braking device, and/or a steering device) of the vehicle as a function of the ascertained vehicle acceleration specification in order to effectuate the automated (longitudinal and/or lateral) guidance of the vehicle.

Furthermore, the device is configured to provide feedback with respect to the ascertained vehicle acceleration specification to at least a part of the plurality of controllers (in particular the one or more planning controllers). The feedback for a controller can indicate whether the controller has actively participated at the specific point in time in the ascertainment of the vehicle acceleration specification or has only passively provided a function-specific acceleration specification. In particular, the feedback for the controller can indicate whether at the specific point in time the function-specific acceleration specification of the controller was used as the vehicle acceleration specification or not.

The feedback can then be taken into consideration by the part of the plurality of controllers in the ascertainment of the respective function-specific acceleration specification for a subsequent point in time (in particular for the point in time from the sequence of points in time directly following the specific point in time). In particular, the functionality of a controller for ascertaining the function-specific acceleration specification for the subsequent point in time can depend on the feedback with respect to the vehicle acceleration specification for the specific point in time.

Due to the feedback of information with respect to the ascertained vehicle acceleration specification to the individual controllers, particularly robust and comfortable operation of multiple automated driving functions can be enabled. In particular, comfortable transitions can thus be effectuated between the respective dominant driving functions acting on the automated longitudinal and/or lateral guidance of the vehicle.

As already described above, the plurality of controllers can comprise at least one planning controller which is configured, for the ascertainment of the function-specific acceleration specification, to plan an acceleration of the vehicle at an upcoming point in time, in particular a course of the acceleration of the vehicle at a sequence of upcoming points in time. In particular, the planning controller can be designed to plan one or more state variables of the vehicle (such as the acceleration) for a sequence of upcoming points in time. Particularly comfortable longitudinal and/or lateral guidance of the vehicle can thus be effectuated. The planning of the acceleration course can be carried out, for example, by a polynomial approach or by quadratic optimization.

The device can be configured to ascertain the function-specific acceleration specification of the planning controller on the basis of the planned acceleration of the vehicle at the upcoming point in time, in particular as the planned acceleration of the vehicle at the upcoming point in time.

For example, for a non-planning controller (such as a P controller, for example), the target value of the acceleration for the specific point in time can be ascertained as the function-specific acceleration specification. On the other hand, for a planning controller, the planned acceleration of the vehicle at an upcoming point in time (which follows the specific point in time, for example, by 0.5 seconds or more) can be used as the function-specific acceleration specification. The comfort upon the transition between various controllers for different driving functions can thus be further increased.

As already described above, the feedback for a planning controller can indicate whether the planning controller has actively participated at the specific point in time in the ascertainment of the vehicle acceleration specification or has only passively provided a function-specific acceleration specification. In particular, the feedback can indicate whether the function-specific acceleration specification of the planning controller was used as the vehicle acceleration specification or not.

The planning of the planning controller for the subsequent point in time, in particular the course of the acceleration of the vehicle predicted or planned by the planning controller, can depend on whether the planning controller has actively participated at the specific point in time in the ascertainment of the vehicle acceleration specification (in particular whether the function-specific acceleration specification of the planning controller was used as the vehicle acceleration specification), or has only passively provided a function-specific acceleration specification (in particular the function-specific acceleration specification of the planning controller was not used as the vehicle acceleration specification).

The planning controller can be designed in particular to ascertain the predicted and/or planned course of the acceleration of the vehicle for the subsequent point in time on the basis of the predicted and/or planned course of the acceleration of the vehicle for the specific point in time when the planning controller has actively participated at the specific point in time in the ascertainment of the vehicle acceleration specification (in particular if the function-specific acceleration specification of the planning controller was used as the vehicle acceleration specification).

Alternatively or additionally, the planning controller can be designed to re-ascertain the predicted and/or planned course of the acceleration of the vehicle for the subsequent point in time without taking into consideration the predicted and/or planned course of the acceleration of the vehicle for the specific point in time if the planning controller has only passively provided a function-specific acceleration specification at the specific point in time (in particular if the function-specific acceleration specification of the planning controller was not used as the vehicle acceleration specification).

Due to the adaptation of the operation of a planning controller as a function of the feedback, the comfort upon the transition between various controllers for different driving functions can be further increased.

As already described above, the device can be configured to repeat the steps described in this document at a sequence of successive points in time (in particular periodically) in order to enable a continuously comfortable parallel operation of multiple driving functions. A plurality of function-specific acceleration specifications can be ascertained here at the respective point in time; a vehicle acceleration specification can be ascertained on the basis of the plurality of function-specific acceleration specifications, and feedback with respect to the ascertained vehicle acceleration specification can be provided to at least a part of the plurality of controllers.

According to a further aspect, a (road) motor vehicle (in particular a passenger vehicle or a truck or a bus or motorcycle) is described, which comprises the device described in this document.

According to a further aspect, a method for ascertaining a vehicle acceleration specification for a vehicle during operation of a plurality of different automated driving functions in a vehicle is described. The method comprises ascertaining for a specific point in time, on the basis of a plurality of controllers for the corresponding plurality of driving functions, a corresponding plurality of function-specific acceleration specifications. Furthermore, the method comprises ascertaining the vehicle acceleration specification for the automated guidance of the vehicle at the specific point in time on the basis of the plurality of function-specific acceleration specifications. In addition, the method comprises providing feedback with respect to the ascertained vehicle acceleration specification for at least a part of the plurality of controllers. The feedback can then be taken into consideration by the part of the plurality of controllers in the ascertainment of the respective function-specific acceleration specification for a subsequent point in time.

According to a further aspect, a software (SW) program is described. The SW program can be configured to be executed on a processor (for example, on a control unit of a vehicle), and to thus carry out the method described in this document.

According to a further aspect, a memory medium is described. The memory medium can comprise a SW program, which is configured to be executed on a processor, and to thus carry out the method described in this document.

The term "automated driving" can be understood in the scope of the document as driving having automated longitudinal or lateral guidance or autonomous driving having automated longitudinal and lateral guidance. Automated driving can involve, for example, driving over a longer time on the freeway or driving for a limited time in the context of parking or maneuvering. The term "automated driving" comprises automated driving with an arbitrary degree of automation. Exemplary degrees of automation are assisted, partially automated, highly automated, or fully automated driving. These degrees of automation were defined by the Bundesanstalt für Straßenwesen [German Federal Highway Research Institute] (BASt) (see BASt publication "Forschung kompakt [compact research]", edition November 2012). In assisted driving, the driver continuously executes the longitudinal or lateral guidance, while the system takes over the respective other function in certain limits. In partially automated driving (PAD), the system takes over the longitudinal and lateral guidance for a certain period of time and/or in specific situations, wherein the driver has to continuously monitor the system as in assisted driving. In highly automated driving (HAD), the system takes over the longitudinal and lateral guidance for a certain period of time without the driver having to continuously monitor the system; however, the driver has to be capable of taking over the vehicle control in a certain time. In fully automated driving (FAD), the system can automatically manage the driving in all situations for a specific application; a driver is no longer necessary for this application. The above-mentioned four degrees of automation correspond to the SAE levels 1 to 4 of the norm SAE J3016 (SAE—Society of Automotive Engineering). For example, highly automated driving (HAD) corresponds to level 3 of the norm SAE J3016. Furthermore, SAE level 5 is also provided as the highest degree of automation in SAE J3016, which is not included in the definition of the BASt. SAE level 5 corresponds to driverless driving, in which the system can automatically manage all situations like a human driver during the entire journey; a driver is generally no longer required.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways.

The invention will be described in more detail hereinafter on the basis of exemplary embodiments. In the figures

BRIEF DESCRIPTION OF THE DRAWINGS

DETAILED DESCRIPTION OF THE DRAWINGS

Figure 1:
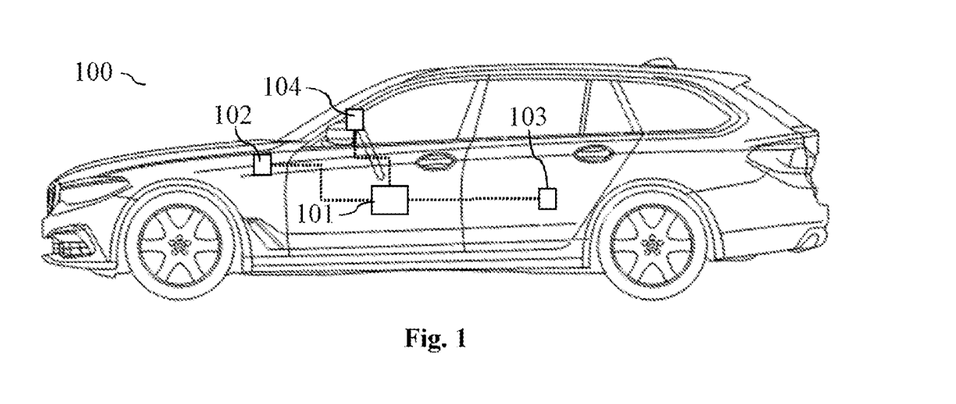
FIG. 1 shows exemplary components of a vehicle.

As described at the outset, the present document relates to increasing the comfort of a vehicle during operation of multiple automated driving functions. In this context, FIG. 1 shows exemplary components of a vehicle 100. The vehicle 100 comprises one or more surroundings sensors 102, which are configured to acquire surroundings data (i.e., sensor data) with respect to the surroundings of the vehicle 100. Exemplary surroundings sensors 102 are a camera, a radar sensor, a lidar sensor, an ultrasonic sensor, etc.

A (control) device 101 of the vehicle 100 can be configured to ascertain information with respect to the surroundings of the vehicle 100 on the basis of the surroundings data, such as for example, the distance to a front vehicle driving in front of the vehicle 100, the course of a lane traveled by the vehicle 100, etc. The device 101 can furthermore be configured to operate one or more longitudinal and/or lateral guidance actuators 103 of the vehicle 100 (e.g., a drive motor, a braking device, and/or a steering device) on the basis of the surroundings data and/or on the basis of the ascertained surroundings information, in particular to effectuate automated longitudinal and/or lateral guidance of the vehicle 100.

The vehicle 100 can furthermore comprise a user interface 104 for a driver of the vehicle 100. It can be made possible for the driver of the vehicle 100 to activate or to deactivate an automated driving function via the user interface 104. Furthermore, it can be made possible for the driver of the vehicle 100 to define an operating parameter of a driving function, such as for example, a setting distance of the vehicle 100 to a front vehicle desired by the driver and/or a setting speed of the vehicle 100 desired by the driver.

Figure 2A:
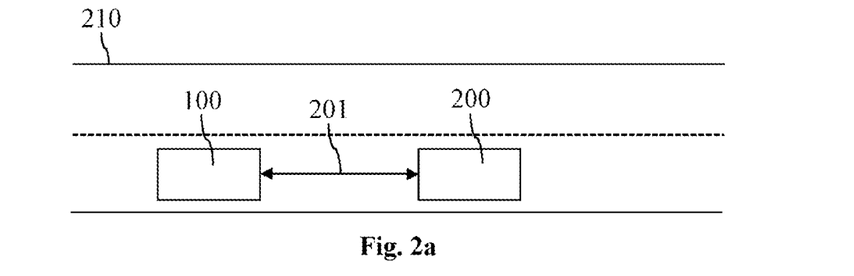
FIGS. 2a to 2c show exemplary driving functions for automated longitudinal guidance of a vehicle.

As described at the outset, multiple driving functions of the vehicle 100 can be operated simultaneously, in particular driving functions which act simultaneously on the longitudinal and/or the lateral guidance of the vehicle 100. FIG. 2a shows, for example, an automatic distance controller, using which the distance 201 of the vehicle 100 to a front vehicle 100 can be set automatically to the stored setting distance. For this purpose, a controller, for example, a P controller can be used, which is designed to regulate the actual distance 201 to the stored setting distance.

Figure 2B:
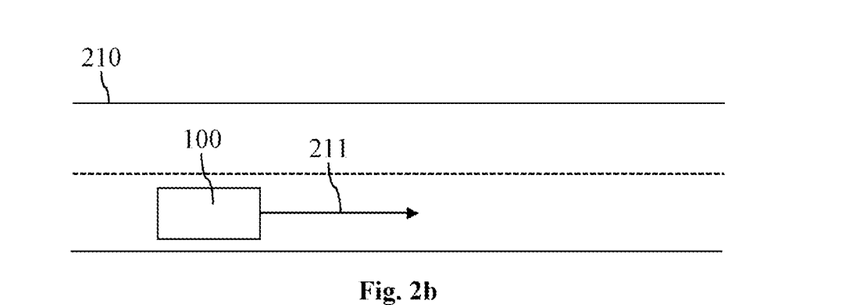

FIG. 2b shows as a further automated driving function a speed controller, in which the driving speed 211 of the vehicle 100 is set during a free drive on a roadway 210 to a stored setting speed. Trajectory planning can take place here in the scope of the controller used in the driving function, in which the state of the vehicle 100, in particular the state with respect to the position of the vehicle 100, with respect to the driving speed 211 of the vehicle 100, and/or with respect to the acceleration of the vehicle 100 is planned for a specific upcoming planning horizon. The actual driving speed 211 of the vehicle 100 can then be set as a function of the trajectory planning. Carrying out trajectory planning enables a free drive with particularly high driving comfort. The trajectory planning can be carried out here using a specific planning approach, for example, using a polynomial approach.

Figure 2C:
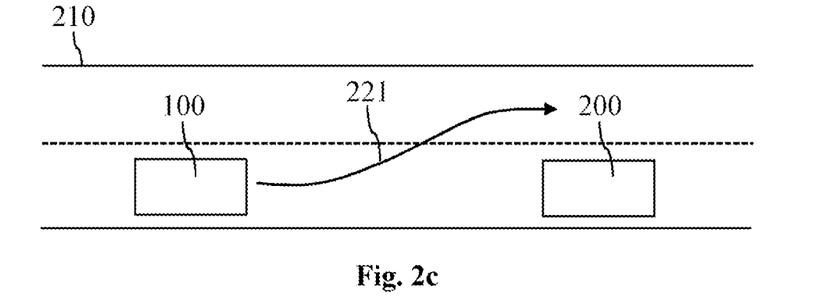

FIG. 2c shows as a further automated driving function a lane change assistant, in which the driving speed 211 of the vehicle 100 can be set on the basis of a planned driving trajectory 221 for a lane change. In the scope of the controller used in this driving function, trajectory planning for a specific planning horizon can in turn take place, wherein the planning approach can differ from the planning approach for a free drive. For example, a quadratic optimization can be carried out to plan a trajectory for a lane change.

Multiple controllers can therefore be operated simultaneously in a vehicle 100, which each have an influence on the automated guidance, in particular on the automated longitudinal guidance, of the vehicle 100. The parallel operation of different controllers, in particular in the event of a transition between different controllers, can possibly result in automated interventions, which can be perceived as uncomfortable by an occupant of the vehicle 100, such as a jerk of the vehicle 100. This can be caused in particular in that different specifications with respect to the acceleration of the vehicle 100 are made by the different controllers, as shown by way of example in FIG. 3.

Figure 3:
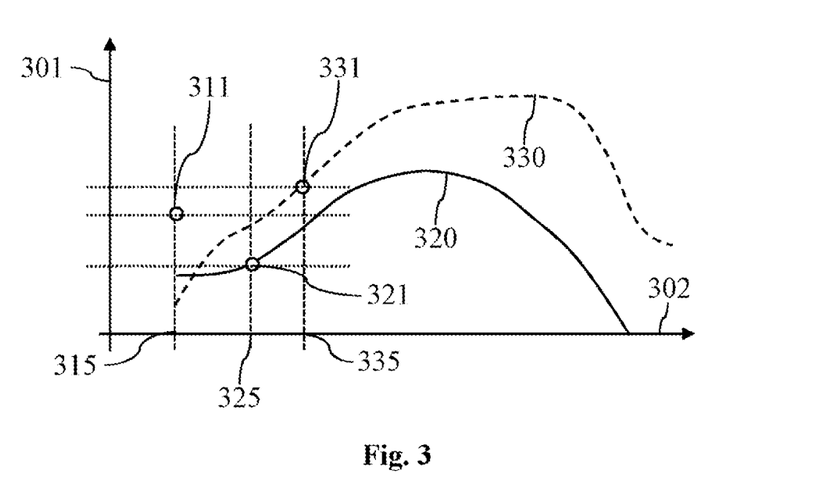
FIG. 3 shows exemplary acceleration specifications of different driving functions of a vehicle.

FIG. 3 shows exemplary acceleration specifications with respect to the acceleration 301 of the vehicle 100, which can be ascertained by different controllers of the vehicle 100. For example, a first acceleration specification 311 for a first point in time 315 can be made by a first controller (for example, the distance controller described in conjunction with FIG. 2*a*). For example, a course 320 with respect to the acceleration 301 as a function of the time 302 can be planned (in the context of the trajectory planning) by a second controller (for example, the speed controller described in conjunction with FIG. 2*b*). The device described in this document can be designed to ascertain a second acceleration specification 321 of the second controller on the basis of the course 320 (for example, as an acceleration 301 of the course 320 for a second point in time 325).

In a corresponding manner, a third acceleration specification 331 of a third controller (for example, of the controller described in conjunction with FIG. 2*c* for a lane change) can possibly be ascertained. The third acceleration specification 331 can be ascertained, for example, as the acceleration 301 of an acceleration course 330 planned by the third controller at a third point in time 335.

Figure 4:
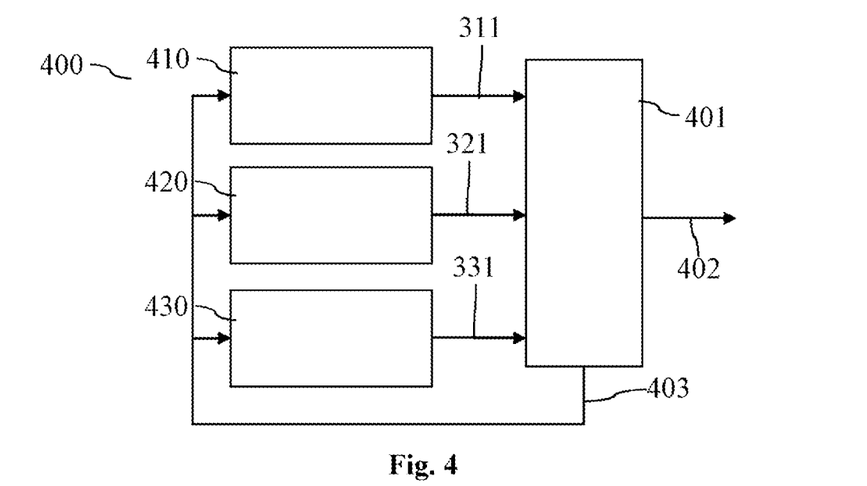
FIG. 4 shows an exemplary device for ascertaining an acceleration specification for a vehicle.

Different acceleration specifications 311, 321, 331 can thus be provided at a specific point in time during the operation of the vehicle 100, which are to be implemented at this specific point in time by the one or more actuators 103 of the vehicle 100. FIG. 4 shows an exemplary device 400 for ascertaining the vehicle acceleration specification 402 for operating a vehicle 100 on the basis of a plurality of function-specific acceleration specifications 311, 321, 331, which are provided by a corresponding plurality of controllers 410, 420, 430 of the vehicle 100. The device 400 comprises a computing unit 401 for this purpose, in particular a selection unit, for ascertaining the vehicle acceleration specification 402 on the basis of the plurality of acceleration specifications 311, 321, 331. The device 400, in particular the computing unit 401 can be designed to select the smallest acceleration specification 311, 321, 331 from the plurality of acceleration specifications 311, 321, 331 as the vehicle acceleration specification 402.

The device 400 can furthermore be configured to provide feedback 403 with respect to the vehicle acceleration specification 402 to at least a part of the controllers 410, 420, 430. The feedback 403 can comprise or indicate here
the value of the vehicle acceleration specification 402; and/or
information as to whether the acceleration specification 311, 321, 331 of the respective controller 410, 420, 430 is incorporated in the value of the vehicle acceleration specification 402 or not, or whether the respective controller 410, 420, 430 participates actively or only passively in the ascertainment of the vehicle acceleration specification 402.

The respective controller 410, 420, 430 can then adapt its respective operation on the basis of the feedback 403. For example, the trajectory planning of a controller 420, 430 can be carried out again in each case (proceeding from the respective current state of the vehicle 100) if the feedback 403 indicates that the acceleration specification 321, 331 ascertained by the controller 420, 430 was not taken into consideration as the vehicle acceleration specification 402.

The above-mentioned ascertainment of a vehicle acceleration specification 402 can be repeated at a sequence of points in time, for example, at a specific repetition rate (e.g., 1 Hz or more, or 10 Hz or more, or 100 Hz or more). A permanently comfortable operation of a vehicle 100 can thus be effectuated.

In the overall chain of the longitudinal control of a vehicle 100, multiple different controllers 410, 420, 430 having different controller approaches can thus be implemented. The different controllers 410, 420, 430 can be designed for different driving tasks (using different control methods), in particular to effectuate the most comfortable and/or safe driving behavior of the vehicle 100 for the respective driving task. The measures described in the present document are directed to effectuating cooperative behavior of the plurality of different controllers 410, 420, 430 and to ensuring smooth transitions between the respective actively considered controllers 410, 420, 430.

As described in conjunction with FIGS. 2*a* to 2*c*, a path guidance controller 410 can be used for a following drive behind a front vehicle 200. During a free drive, a controller 420 having a planning approach can be used. Furthermore, a controller 430 having a different planning approach can be used during a lane change or during a lane change preparation.

The specifications 311, 321, 331 of the different controllers 410, 420, 430 can be fused to form a target acceleration 402 for the vehicle 100. Depending on the controller, a directly specified target acceleration 311 (for the current (specific) point in time 315) or a predicted target acceleration 321, 331 (for a chronologically upcoming point in time 325, 335) can be taken into consideration here.

A minimum selection of the specified target accelerations 311, 321, 331 as the vehicle target acceleration 402 can take place. The controller 410, 420, 430 having the lowest requirement with respect to the acceleration or having the greatest deceleration intention can thus be given priority.

The controllers 410, 420, 430 can be informed about the currently prioritized controller 410, 420, 430 via feedback 403. The one or more non-prioritized controllers 410, 420, 430 stay in a passive state in this time and continue (e.g., periodically) to output their individual target acceleration 311, 321, 331. Furthermore, the currently prioritized target acceleration 402 can be returned to the controllers 410, 420, 430 as the feedback 403. A smooth transition between the controllers 410, 420, 430 can thus be effectuated in a particularly reliable manner.

A driving situation in which, for example, transitions between different controllers 410, 420, 430 can occur is carrying out or preparing for a lane change on a freeway. A free drive and/or a following drive can initially be carried out in this case, which is to be merged smoothly into a lane change maneuver.

Figure 5:
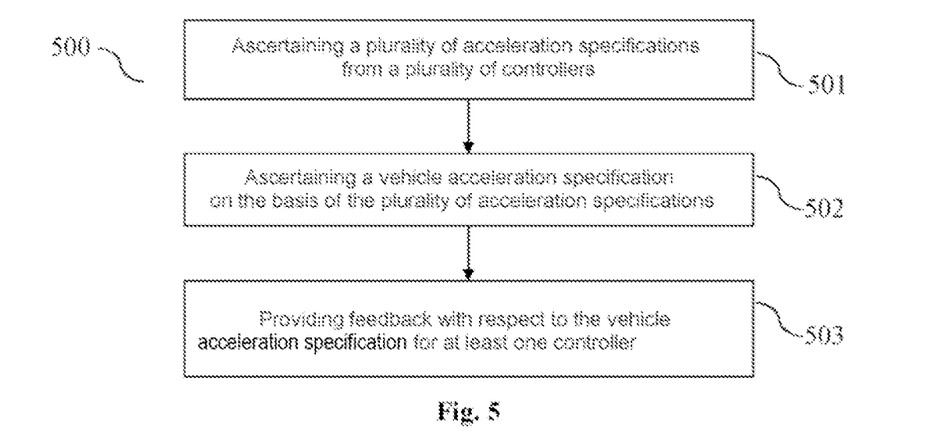
FIG. 5 shows a flow chart of an exemplary method for ascertaining an acceleration specification for a vehicle.

FIG. 5 shows a flow chart of a (possibly computer-implemented) method 500 for ascertaining a vehicle acceleration specification 402 for a vehicle 100 during operation of a plurality of different automated driving functions in a vehicle 100. The different automated driving functions can each be directed to automated longitudinal and/or lateral guidance of the vehicle 100. A (separate) controller can be operated here in each case in the scope of the individual driving functions, in particular to ascertain repeatedly, for example periodically, an acceleration specification (i.e., a target acceleration) for the vehicle 100. The acceleration specification which is ascertained on the basis of the controller of a driving function is designated in this document as a "function-specific" acceleration specification. The acceleration specification can relate to a specification for the longitudinal acceleration and/or to a specification for the lateral acceleration of the vehicle 100. In the vehicle 100, for example, 2 or more or 3 or more driving functions can be operated in parallel, which each have an influence on the automated longitudinal and/or lateral guidance of the vehicle 100.

The method 500 can be repeated (periodically at a specific frequency of, for example, 1 Hz or more, or 10 Hz or more, or 100 Hz or more). The method 500 can comprise here for a or at a specific point in time, ascertaining 501, on the basis of the plurality of controllers 410, 420, 430 for the corresponding plurality of driving functions, a corresponding plurality of function-specific acceleration specifications 311, 321, 331. Multiple controllers 410, 420, 430 can therefore be operated separately, in order to provide multiple different function-specific acceleration specifications 311, 321, 331 for a specific point in time from the sequence of points in time.

The method 500 furthermore comprises ascertaining 502 the vehicle acceleration specification 402 for the automated (longitudinal and/or lateral) guidance of the vehicle 100 at the specific point in time on the basis of the plurality of function-specific acceleration specifications 311, 321, 331. In particular the function-specific acceleration specification 311, 321, 331 can be selected here from the plurality of function-specific acceleration specifications 311, 321, 331 as the vehicle acceleration specification 402 which (in consideration of the sign) has the smallest value (wherein a positive value corresponds to an acceleration of the vehicle 100 and wherein a negative value corresponds to a deceleration of the vehicle 100).

The automated longitudinal and/or lateral guidance of the vehicle 100 can then be effectuated at the specific point in time on the basis of the ascertained vehicle acceleration specification 402. In particular, at least one longitudinal and/or lateral guidance actuator 103 of the vehicle 100 can be operated in order to implement the ascertained vehicle acceleration specification 402. A more reliable and comfortable operation of multiple driving functions in a vehicle 100 can thus be effectuated.

Furthermore, the method 500 can comprise providing 503 feedback 403 with respect to the ascertained vehicle acceleration specification 402 for at least a part of the plurality of controllers 410, 420, 430. The feedback 403 can in particular indicate to a controller 410, 420, 430 whether the function-specific acceleration specification 311, 321, 331 ascertained by the controller 410, 420, 430 has been incorporated at the specific point in time into the ascertained vehicle acceleration specification 402. In particular, it can be indicated to the controller 410, 420, 430 as the feedback 403 whether the function-specific acceleration specification 311, 321, 331 ascertained by the controller 410, 420, 430 was used at the specific point in time as the vehicle acceleration specification 402 or not. Furthermore, the value of the vehicle acceleration specification 402 can be provided as the feedback 403.

The feedback 403 can be taken into consideration by the part of the plurality of controllers 410, 420, 430 in the ascertainment of the respective function-specific acceleration specification 311, 321, 331 for a subsequent point in time from the sequence of points in time. In particular, the function-specific acceleration specification 311, 321, 331 ascertained by a controller 410, 420, 430 for the subsequent point in time can depend on the feedback 403 with respect to the vehicle acceleration specification 402 ascertained for the specific point in time. The reliability and the comfort of the automated longitudinal and/or lateral guidance of a vehicle 100 during operation of multiple driving functions can thus be further increased.

The comfort of the automated (longitudinal) guidance of a vehicle 100 during the parallel operation of multiple automated driving functions can thus be increased by the measures described in this document.

The present invention is not restricted to the exemplary embodiment shown. In particular, it is to be noted that the description and the figures are only to illustrate the principle of the proposed methods, devices, and systems by way of example.

What is claimed is:

1. An apparatus for determining a vehicle acceleration specification for a vehicle during operation of a plurality of different automated driving functions in a vehicle;
   wherein the apparatus is configured to:
   determine a plurality of function-specific acceleration specifications based on a plurality of controllers for the plurality of driving functions at a specific point in time;
   determine the vehicle acceleration specification for automated guidance of the vehicle at the specific point in time based on the plurality of function-specific acceleration specifications; and
   provide feedback with respect to the determined vehicle acceleration specification to at least a part of the plurality of controllers;
   wherein the feedback is taken into consideration by the part of the plurality of controllers in determining the plurality of function-specific acceleration specifications for a subsequent point in time.

2. The apparatus according to claim 1, wherein the apparatus is configured to select a smallest function-specific acceleration specification of the plurality of function-specific acceleration specifications as the vehicle acceleration specification.

3. The apparatus according to claim 2, wherein the apparatus is configured to select the smallest function-specific acceleration specification as the vehicle acceleration specification for a least possible acceleration or a greatest possible deceleration of the vehicle.

4. The apparatus according to claim 1, wherein
   the plurality of controllers comprises at least one planning controller, which is configured to determine the function-specific acceleration specification, to plan an acceleration of the vehicle at an upcoming point in time, and a course of the acceleration of the vehicle at a sequence of upcoming points in time; and
   the apparatus is configured to determine the function-specific acceleration specification of the planning controller based on the planned acceleration of the vehicle at the upcoming point in time.

5. The apparatus according to claim 1, wherein
   the plurality of controllers comprises at least one planning controller;
   the feedback for the planning controller indicates whether the planning controller has actively participated in determining the vehicle acceleration specification at the specific point in time, or has only passively provided a function-specific acceleration specification; and
   planning a course of the acceleration of the vehicle predicted by the planning controller, for the subsequent point in time is dependent on whether the planning controller has actively participated in determining the vehicle acceleration specification at the specific point in time, or has only passively provided a function-specific acceleration specification.

6. The apparatus according to claim 5, wherein the planning controller is configured to:
determine the predicted course of the acceleration of the vehicle for the subsequent point in time based on a predicted course of the acceleration of the vehicle for the specific point in time if the planning controller has actively participated in determining the vehicle acceleration specification at the specific point in time; and/or
determine the predicted course of the acceleration of the vehicle for the subsequent point in time again without taking into consideration a predicted course of the acceleration of the vehicle for the specific point in time if the planning controller has only passively provided a function-specific acceleration specification at the specific point in time.

7. The apparatus according claim 1, wherein the plurality of automated driving functions comprises at least one of:
a distance controller for a following drive of the vehicle;
a speed controller for a free drive of the vehicle; and
a lane change assistant for a lane change of the vehicle.

8. The apparatus according to claim 1, wherein the plurality of controllers comprises at least one of:
a path guidance controller;
a P controller; and
a planning controller, which is designed to plan an upcoming trajectory of the vehicle in order to determine the function-specific acceleration specification.

9. The apparatus according to claim 1, wherein the apparatus is configured to operate at least one of a longitudinal guidance actuator and a lateral guidance actuator of the vehicle as a function of the determined vehicle acceleration specification.

10. The apparatus according to claim 1, wherein the apparatus is configured, at each of a sequence of successive points in time to:
determine the plurality of function-specific acceleration specifications;
determine a vehicle acceleration specification based on the plurality of function-specific acceleration specifications; and
provide feedback with respect to the determined vehicle acceleration specification to the part of the plurality of controllers.

11. A method for determining a vehicle acceleration specification for a vehicle during operation of a plurality of different automated driving functions in a vehicle, the method comprising:
determining, based on a plurality of controllers for the plurality of driving functions, a plurality of function-specific acceleration specifications at a specific point in time;
determining the vehicle acceleration specification for automated guidance of the vehicle at the specific point in time based on the plurality of function-specific acceleration specifications; and
providing feedback with respect to the determined vehicle acceleration specification to at least a part of the plurality of controllers;
wherein the feedback is taken into consideration by the part of the plurality of controllers in determining the plurality of function-specific acceleration specifications for a subsequent point in time.

* * * * *